(12) United States Patent
Giurgiu et al.

(10) Patent No.: US 11,162,793 B2
(45) Date of Patent: Nov. 2, 2021

(54) METHOD AND APPARATUS FOR AUTONOMOUS NAVIGATION SPEED AT INTERSECTIONS

(71) Applicant: HERE GLOBAL B.V., Veldhoven (NL)

(72) Inventors: Gavril Giurgiu, Chicago, IL (US);
Dongwook Jang, Lisle, IL (US)

(73) Assignee: HERE Global B.V., Veldhoven (NL)

( * ) Notice: Subject to any disclaimer, the term of this patent is extended or adjusted under 35 U.S.C. 154(b) by 272 days.

(21) Appl. No.: 14/854,943

(22) Filed: Sep. 15, 2015

(65) Prior Publication Data
US 2017/0074663 A1    Mar. 16, 2017

(51) Int. Cl.
| | | |
|---|---|---|
| *G01C 21/20* | (2006.01) | |
| *G05D 1/00* | (2006.01) | |
| *G05D 1/02* | (2020.01) | |
| *G08G 1/01* | (2006.01) | |

(Continued)

(52) U.S. Cl.
CPC .............. *G01C 21/20* (2013.01); *G01C 21/32* (2013.01); *G05D 1/0088* (2013.01); *G05D 1/0212* (2013.01); *G08G 1/0112* (2013.01); *G08G 1/0129* (2013.01); *G08G 1/0141* (2013.01); *G08G 1/052* (2013.01)

(58) Field of Classification Search
CPC .. G01C 21/20; G05D 1/0088; G05D 1/02125; B60W 2550/143
See application file for complete search history.

(56) References Cited

U.S. PATENT DOCUMENTS

| | | | | |
|---|---|---|---|---|
| 8,918,282 B1* | 12/2014 | Stenneth | ............... | G08G 1/0112 |
| | | | | 701/117 |
| 9,014,977 B2* | 4/2015 | Beaurepaire | ........... | G01C 21/34 |
| | | | | 340/988 |
| 9,103,694 B2* | 8/2015 | Ozturk | ............... | G01C 21/3632 |

(Continued)

OTHER PUBLICATIONS

McCormack et al., "GPS tracking of freight vehicles to identify and classify bottlenecks", 15th International IEEE Conference on Intelligent Transportation Systems, Sep. 16-19, 2012, Alaska, USA, retrieved on Jun. 19, 2017, from "http://ieeexplore.ieee.org/document/6338666/", 6 pages.

(Continued)

*Primary Examiner* — Mathew Franklin Gordon
(74) *Attorney, Agent, or Firm* — Ditthavong, Steiner & Mlotkowski

(57) ABSTRACT

An approach is provided for separating past speed data into speed profiles corresponding to multi-modal segments of a travel network. A navigation processing platform determines one or more links of at least one travel network that includes at least one split into two or more links. The navigation processing platform processes and/or facilitates a processing of probe data associated with the one or more links to determine that the one or more links exhibit a multi-modality with respect to travel speed. The navigation processing platform then determines a plurality of speed profiles for one or more segments of the one or more links based, at least in part, on the multi-modality. The navigation processing platform further causes, at least in part, a generation of at least one travel speed map that associates the plurality of speed profiles with the one or more segments of the one or more links.

17 Claims, 13 Drawing Sheets

(51) Int. Cl.
*G01C 21/32* (2006.01)
*G08G 1/052* (2006.01)

(56) References Cited

U.S. PATENT DOCUMENTS

| | | | | |
|---|---|---|---|---|
| 9,628,958 | B1* | 4/2017 | McBurney | H04W 4/027 |
| 2010/0033333 | A1* | 2/2010 | Victor | A61B 3/113 |
| | | | | 340/576 |
| 2011/0301802 | A1* | 12/2011 | Rupp | G08G 1/0112 |
| | | | | 701/408 |
| 2012/0095682 | A1 | 4/2012 | Wilson | |
| 2013/0226622 | A1* | 8/2013 | Adamson | G06Q 40/08 |
| | | | | 705/4 |
| 2013/0304279 | A1* | 11/2013 | Mudalige | G08G 1/164 |
| | | | | 701/2 |
| 2013/0317744 | A1 | 11/2013 | Mieth et al. | |
| 2014/0149028 | A1 | 5/2014 | Chapman et al. | |
| 2015/0166062 | A1* | 6/2015 | Johnson | B60W 30/12 |
| | | | | 701/41 |

OTHER PUBLICATIONS

European Office Action for related European Patent Application No. 16187486.2-1557 dated Feb. 8, 2017, 11 Pages.
Office Action for corresponding European Patent Application No. 16 187 486.2-1557, dated Dec. 1, 2017, 7 pages.
Office Action for corresponding European Patent Application No. 16 18 486.2-1003, dated Sep. 5, 2018, 6 pages.

* cited by examiner

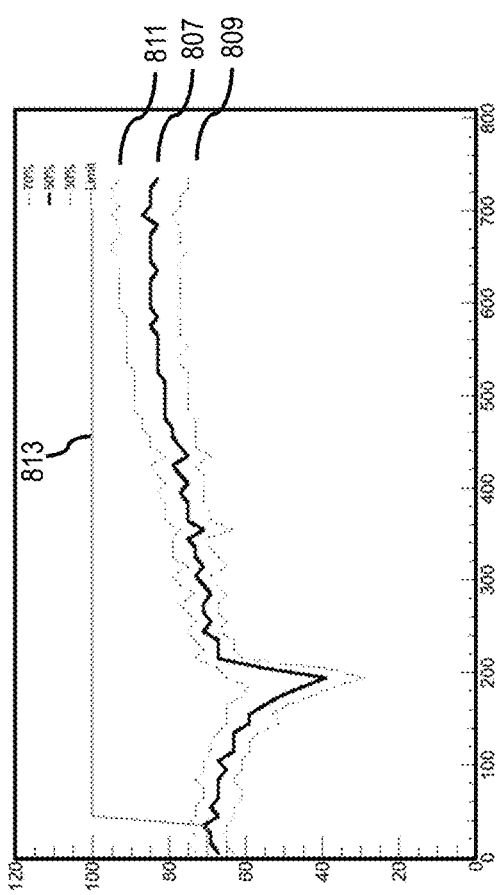
FIG. 8C
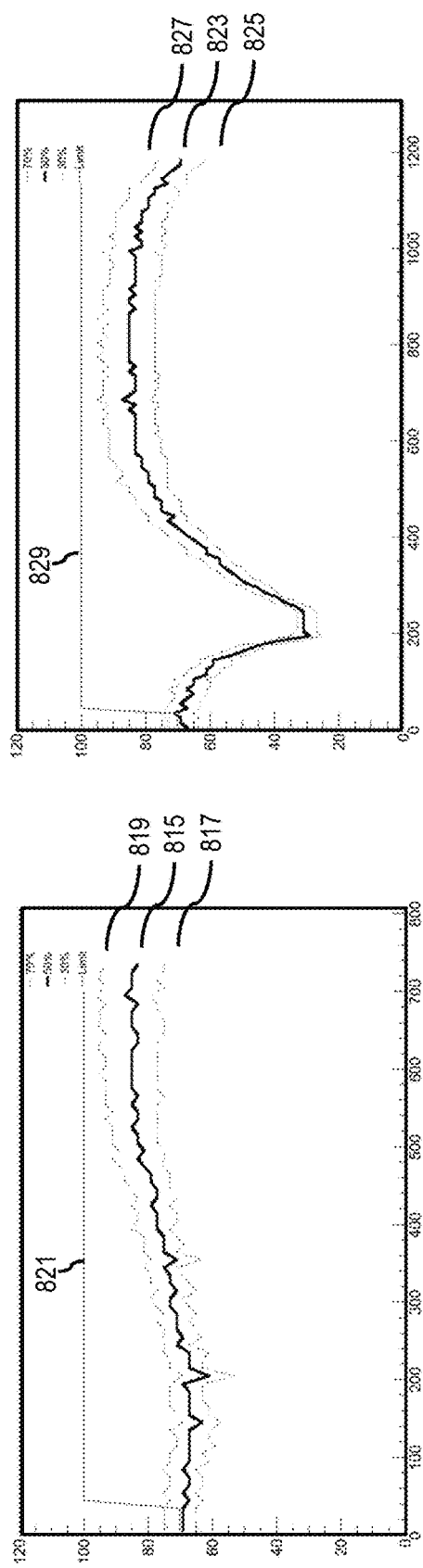
FIG. 8E
FIG. 8D

METHOD AND APPARATUS FOR AUTONOMOUS NAVIGATION SPEED AT INTERSECTIONS

BACKGROUND

Autonomous vehicles and vehicles equipped with predictive control can benefit from having a map layer which provides typical driving speeds on every road segment with high spatial granularity. Such speed profiles can be used by predictive cruise control and autonomous vehicles to provide a human-like driving experience. However, a problem can appear on a link of a road segment before an intersection or a split in a travel route. The speed distribution or profile on these links has a bi-modal or multi-modal structure and, therefore, an average or median speed calculation for such links would represent neither the high continuing speed nor the low turning or exiting speed of the one or more possible options. Accordingly, service providers face significant technical challenges to develop typical speed profiles for every driving option within a travel network (e.g., driving forward, turning, exiting, etc.) such that an autonomous vehicle or a vehicle equipped with predictive cruise control, knowing the intended route and the corresponding speed profiles, can provide a user with an optimal driving experience.

Some Example Embodiments

Therefore, there is a need for an approach for separating or disambiguating past speed data into speed profiles corresponding to multi-modal segments of a travel network.

According to one embodiment, a method comprises determining one or more links of at least one travel network that includes at least one split into two or more links. The method also comprises processing and/or facilitating a processing of probe data associated with the one or more links to determine that the one or more links exhibit a multi-modality with respect to travel speed. The method further comprises determining a plurality of speed profiles for one or more segments of the one or more links based, at least in part, on the multi-modality. The method also comprises causing, at least in part, a generation of at least one travel speed map that associates the plurality of speed profiles with the one or more segments of the one or more links.

According to another embodiment, an apparatus comprises at least one processor, and at least one memory including computer program code for one or more computer programs, the at least one memory and the computer program code configured to, with the at least one processor, cause, at least in part, the apparatus to determine one or more links of at least one travel network that includes at least one split into two or more links. The apparatus is also caused to process and/or facilitate a processing of probe data associated with the one or more links to determine that the one or more links exhibit a multi-modality with respect to travel speed. The apparatus is further caused to determine a plurality of speed profiles for one or more segments of the one or more links based, at least in part, on the multi-modality. The apparatus also causes, at least in part, a generation of at least one travel speed map that associates the plurality of speed profiles with the one or more segments of the one or more links.

According to another embodiment, a computer-readable storage medium carries one or more sequences of one or more instructions which, when executed by one or more processors, cause, at least in part, an apparatus to determine one or more links of at least one travel network that includes at least one split into two or more links. The apparatus is also caused to process and/or facilitate a processing of probe data associated with the one or more links to determine that the one or more links exhibit a multi-modality with respect to travel speed. The apparatus is further caused to determine a plurality of speed profiles for one or more segments of the one or more links based, at least in part, on the multi-modality. The apparatus also causes, at least in part, a generation of at least one travel speed map that associates the plurality of speed profiles with the one or more segments of the one or more links.

According to another embodiment, an apparatus comprises means for determining one or more links of at least one travel network that includes at least one split into two or more links. The apparatus also comprises means for processing and/or facilitating a processing of probe data associated with the one or more links to determine that the one or more links exhibit a multi-modality with respect to travel speed. The apparatus further comprises means for determining a plurality of speed profiles for one or more segments of the one or more links based, at least in part, on the multi-modality. The apparatus also comprises means for causing, at least in part, a generation of at least one travel speed map that associates the plurality of speed profiles with the one or more segments of the one or more links In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A-8E are diagrams of an example multi-modal speed distribution separated using the counting process, according to one embodiment;

DESCRIPTION OF SOME EMBODIMENTS

Examples of a method, apparatus, and computer program for separating past speed data into speed profiles corresponding to multi-modal segments of a travel network are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
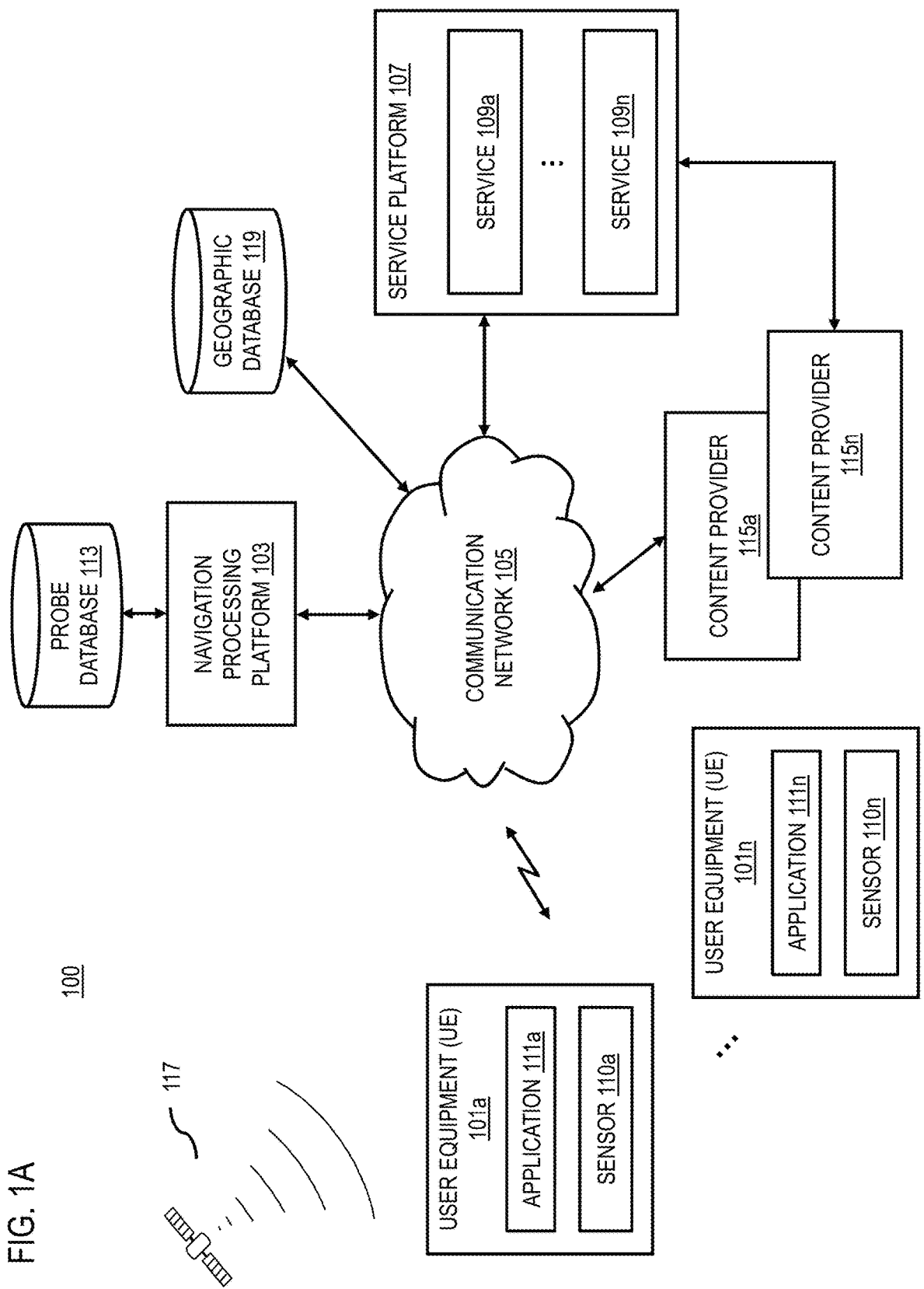
FIG. 1A is a diagram of a system capable of separating past speed data into speed profiles corresponding to multi-modal segments of a travel network, according to one embodiment.

FIG. 1A is a diagram of a system capable of separating past speed data into speed profiles corresponding to multi-modal segments of a travel network, according to one embodiment. As discussed above, providers of traffic data, map data, and other location-based services face significant challenges to develop speed profiles corresponding to every driving option within a travel network (e.g., going forward, turning, exiting, taking a break, etc.). Autonomous vehicles and vehicles equipped with predictive cruise control can benefit from having a map layer which provides typical driving speeds on every road segment with high spatial granularity. Such speed profiles can be used by predictive cruise control and autonomous vehicles to provide a human-like driving experience (e.g., despite the automotive capabilities of a vehicle in terms of speed, acceleration, braking, etc., an individual may still feel safe and comfortable within the vehicle while traveling). A considerable amount of past global position system (GPS) probe data has been accumulated over time and this data can be used to develop the corresponding speed profiles. For example, along an 8 kilometer (km) route in Frankfurt, Germany a general speed profile may be generated using three years of map matched past GPS probe data. The map matched data may be separated into 10 meter (m) segments along the road, for example, and for each segment various speed percentiles may be calculated (e.g., the median speed (50%), ±20% of median speed, ±40% of median speed). However, a problem can appear on links immediately before an intersection. At an intersection or exit, the probe data demonstrates that some vehicles continue straight ahead with the same speed while other vehicles slow down and may even stop to take turns or to exit the route. Consequently, the speed distributions on these links have a bi-modal or multi-modal structure and, therefore, an average or median speed calculation would represent neither the high continuing speed nor the low turning or exiting speed. This is problematic for autonomous vehicles or vehicles using predictive cruise control since these vehicles often rely on such average or median speed calculations for traveling.

To address this problem, a system 100 of FIG. 1A introduces the capability to separate past speed data into speed profiles corresponding to multi-modal segments of a travel network. In one embodiment, the system 100 determines one or more links or segments of at least one travel network that includes at least one split into two or more links. By way of example, the system 100 may determine that one or more links split into two or more links based on a determination of a bi-modal or multi-modal speed distribution among the one or more links (e.g., a multi-modal speed distribution at an intersection). In one embodiment, the system 100 may determine the one or more links based on 10 m segments along the travel network.

In one embodiment, the system 100 processes and/or facilitates a processing of probe data associated with the one or more links to determine that the one or more links exhibit a multi-modality with respect to travel speed. By way of example, the probe data may include map matched historical GPS probe data (e.g., collected over a number of years). In one embodiment, the system 100 may determine that the one or more links exhibit a multi-modality with respect to travel speed based on a statistical process or based on a counting process. By way of example, the multi-modality may be determined on a link including an intersection or an exit where a portion of the vehicular traffic continues straight at the same speed (e.g., 80 kilometers per hour (kph)) while another portion of the traffic slows down (e.g., 80 kph to 10 kph) and/or stops to make a turn or to take an exit. Consequently, the two travel speeds represent a multi-modality with respect to traveling on that segment of the one or more links.

In one embodiment, the system 100 determines a plurality of speed profiles for one or more segments of the one or more links based, at least in part, on the multi-modality. By way of example, the plurality of speed profiles correspond to one or more options for traversing the at least one split into the two or more links (e.g., driving straight or turning). In one embodiment, to determine a plurality of speed profiles, the system 100 first splits the one or more map links into two categories: (Type I links) links which connect to a single other link in the direction of traffic and (Type II links) links which split into two or more links in the direction of the traffic. In one embodiment, the system 100 determines or constructs the plurality of speed profiles for Type I links by calculating the speed percentiles (e.g., 30%, 50%, and 70%) using all probes on the link. With respect to Type II links, a plurality of speed profiles are required for an autonomous vehicle or a vehicle using predictive speed control because, taking the example just described, if an autonomous vehicle were to simply follow a speed profile (e.g., 30 kph) representing an average or the median of the through traffic (e.g., 50 kph) and the turning traffic speeds (e.g., 10 kph), the vehicle would drive too slow through the intersection relative to the other traffic or would drive too fast to safely negotiate the turn or exit.

In one embodiment, with respect to Type II links, the system 100 determines one or more speed distributions of the probe data. By way of example, the system 100 can scan one-dimensional speed distributions in each 10 m segment along one or more links. In one embodiment, the system 100 causes, at least in part, a generation of at least one histogram of the one or more speed distributions along the one-dimensional axis of the one or more segments (i.e., using a statistical process). In one embodiment, the at least one histogram is a bin-based histogram and the bin-based histogram includes one or more bins associated with one or more speed intervals. For example, the speed distributions may be represented by 10 kph bins. In one embodiment, the system 100 determines that the one or more links exhibit a multi-modality with respect to speed based, at least in part, on the at least one histogram. By way of example, if two statistically significant peaks or concentrations are determined by the system 100 (e.g., a through traffic peak at 50 kph and a turning traffic peak at 10 kph), then the system 100 can classify the distribution as bi-modal or multi-modal and calculate separate speed profiles for the one or more segments of the one or more links. In one embodiment, the system 100 determines travel speed information for the plurality of speed profiles based on the at least one histogram. By way of example, the system 100 can separate or disambiguate the plurality of speed profiles into a speed profile from the high peak of the at least one histogram (representing the through traffic) and a speed profile from the low peak of the at least one histogram (representing the turning or exiting traffic). From each of these speed profiles, the system 100 can determine travel speed information for an autonomous vehicle, for example, so that a user of the vehicle may enjoy an optimal experience.

In one embodiment, with respect to the Type II links, rather than generate at least one histogram, the system 100 can determine a first number of the at least one split into the two or more links (i.e., using a counting process). By way of example, the system 100 may implement the counting process where more than two splits are present (e.g., at a four-way intersection) and/or when the speed separation between different traffic directions is minimal. In one embodiment, the system 100 constructs as many speed profiles as number of road splits in the fork of the travel route. For example, in the case of a highway with an exit ramp, the system 100 can construct two speed profiles using the counting process. In one embodiment, the system 100 causes, at least in part, a distribution of the probe data among the plurality of speed profiles based on which of the two or more links the probe data is associated with. By way of example, probes that are determined by the system 100 to be on the current link and on the next forward link are combined by the system 100 to generate a forward traffic speed profile. Similarly, probes that are determined by the system 100 to be on the current link and on the next exit link are combined by the system 100 to generate an exit speed profile. Probes determined by the system 100 to be on the current link and not on the next forward link or the next exit link (e.g., vehicles that have stopped or are parked) are ignored by the system 100. In one embodiment, the system 100 determines travel speed information for the plurality of speed profiles based on the distribution of the probe data. By way of example, the system 100 can determine that the media or travel speed for forward driving vehicles that do not slow down to exit is around 80 kph and that the median or travel speed for exiting traffic, which exhibits the expected dip before intersections, is around 70-80 kph, dipping down to 30 kph at the exit, and then accelerating back up to 70-80 kph.

In one embodiment, the system 100 causes, at least in part, a generation of a travel speed map that associates the plurality of speed profiles with the one or more segments of the one or more links. By way of example, the system 100 can generate the travel speed map from the speed percentiles for Type I links and the travel speed information determined by the system 100 from either the statistical process or the counting process for Type II links. In one embodiment, the system 100 determines at least one route associated with at least one vehicle. For example, the system 100 may determine the at least one route based on a user's entry of a desired destination (e.g., a hotel) into an embedded navigation system of the at least one vehicle. By way of example, the at least one vehicle includes, at least in part, an autonomous vehicle, a highly-assisted-driving vehicle, a vehicle with predictive or adaptive cruise control, or a combination thereof. In one embodiment, the system 100 determines one or more operational speed profiles for the at least one vehicle from among the plurality of speed profiles based on the travel speed map. By way of example, the operational speed profile may be a speed at which despite the automotive capabilities of the vehicle (e.g., an autonomous vehicle) in terms of speed, acceleration, braking, etc., an individual may still feel safe and comfortable within the vehicle while traveling (e.g., within ±40% of the median speed) and/or at a speed with which the vehicle may safely interact with one or more other vehicles on the same route.

As shown in FIG. 1A, the system 100 comprises one or more user equipment (UE) 101a-101n (also collectively referred to herein as UEs 101) having connectivity to a navigation processing platform 103 via a communication network 105. By way of example, the UEs 101 may be an in-vehicle or embedded navigation system, a personal navigation device ("PND"), a portable navigation device, a cellular telephone, a mobile phone, a personal digital assistant ("PDA"), a watch, a camera, a computer and/or other device that can perform navigation or location-based functions (i.e., digital routing and map display). It is contemplated, in future embodiments, that the cellular telephone may be interfaced with an on-board navigation system of an autonomous vehicle or physically connected to the vehicle for serving as the navigation system. Also, the UEs 101 may be configured to access a communication network 105 by way of any known or still developing communication protocols. Via this communication network 105, the UEs 101 may transmit probe data as well as access various network based services for facilitating state classification.

Also, the UEs 101 may be configured with navigation applications 111a-111n (also collectively referred to as applications 111) for interacting with one or more content providers 115a-115n (collectively referred to as content providers 115), services 109a-109n (collectively referred to as services 109) of a service platform 107, or a combination thereof. Per these services, the navigation applications 111 of the UE 101 may acquire navigation information, location information, mapping information and other data associated with the current location of the vehicle, a direction or movement of the vehicle along a roadway, etc. Hence, the content providers 115 and services 109 rely upon the gathering of probe data for executing the aforementioned services.

The UEs 101 may be configured with various sensors 110a-110n (also collectively referred to as sensors 110) for acquiring and/or generating probe data regarding a vehicle, a driver, other vehicles, conditions regarding the driving environment or roadway, etc. For example, sensors 110 may be used as GPS receivers for interacting with one or more satellites 117 to determine and track the current speed, position and location of a vehicle travelling along a roadway. In addition, the sensors 110 may gather tilt data (e.g., a degree of incline or decline of the vehicle during travel), motion data, light data, sound data, image data, weather data, temporal data and other data associated with the vehicle and/or UEs 101 thereof. Still further, the sensors 110 may detect local or transient network and/or wireless signals, such as those transmitted by nearby devices during navigation of a vehicle along a roadway. This may include, for example, network routers configured within a premise (e.g., home or business), another UE 101 or vehicle or a communicable traffic system (e.g., traffic lights, traffic cameras, traffic signals, digital signage). In one embodiment, the navigation processing platform 103 aggregates probe data gathered and/or generated by the UEs 101 resulting from the driving of multiple different vehicles over a road/travel network (e.g., map matched past GPS probe data gathered over a three-year period). The probe data may be separated by the navigation processing platform 103 based, at least in part, on a multi-modal classification.

By way of example, the navigation processing platform 103 may be implemented as a cloud based service, hosted solution or the like for performing the above described functions. Alternatively, the navigation processing platform 103 may be directly integrated for processing data generated and/or provided by one or more services 109, content providers 115 or applications 111. Per this integration, the navigation processing platform 103 may perform client-side state classification for travel segments with multi-modal speed profiles. In one embodiment, the navigation processing platform 103 may include or be associated with at least one probe database 113. The at least one probe database 113 may include, at least in part, map matched GPS probe data collected over a period of time (e.g., a three-year period).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

A UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 101 can support any type of interface to the user (such as "wearable" circuitry, etc.).

By way of example, the UE 101s, the navigation processing platform 103, the service platform 107, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
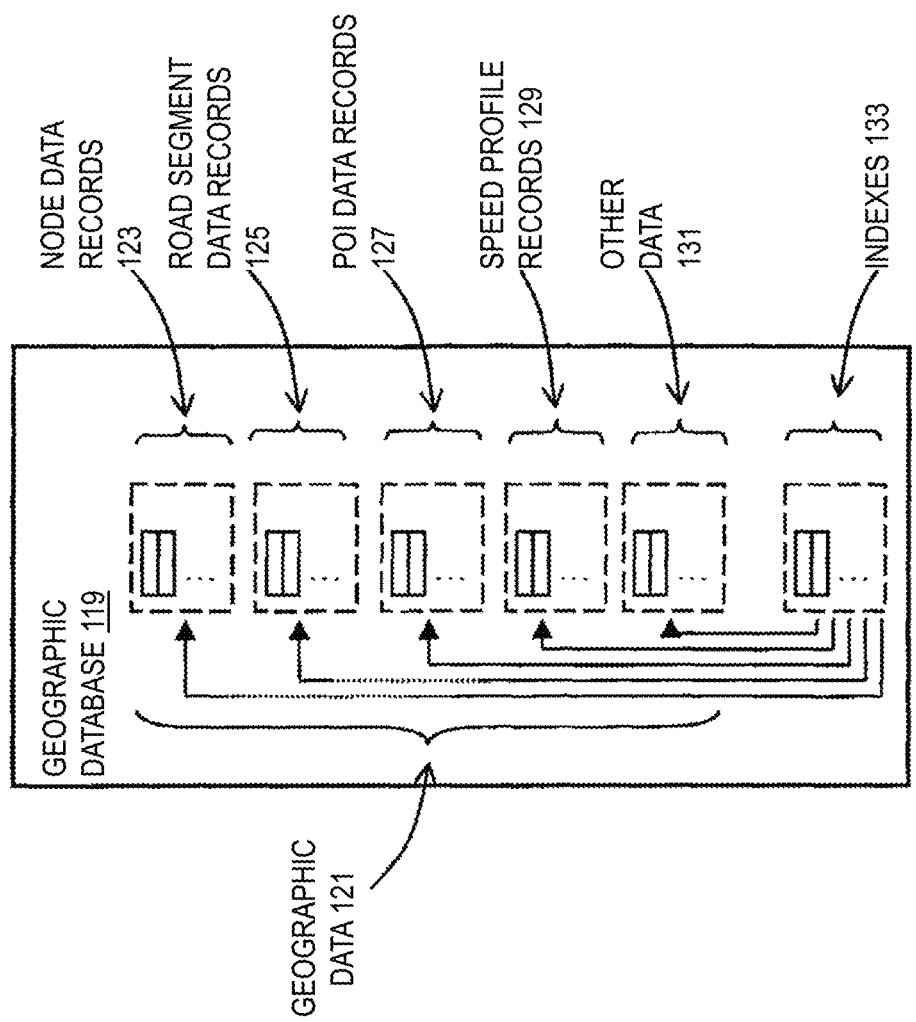
FIG. 1B is a diagram of a geographic database, according to one embodiment.

FIG. 1B is a diagram of the geographic database 119, according to one embodiment. In one embodiment, state classification information, multi-modal detection information, and/or any other information used or generated by the system 100 with respect to providing state classification for a travel segment with multi-modal speed profiles can be stored, associated with, and/or linked to the geographic database 119 or data thereof. In one embodiment, the geographic or map database 119 includes geographic data 121 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 119 includes node data records 123, road segment or link data records 125, point of interest (POI) data records 127, speed profile records 129, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In one embodiment, the POI data records 127 may also include information on locations of traffic controls (e.g., stoplights, stop signs, crossings, etc.).

In exemplary embodiments, the road segment data records 125 are links or segments representing roads, streets, or paths, as can be used in the calculated route or recorded route information. The node data records 123 are end points corresponding to the respective links or segments of the road segment data records 125. The road link data records 125 and the node data records 123 represent a road network, such as used by vehicles, cars, and/or other entities. Alternatively, the geographic database 119 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 119 can include data about the POIs and their respective locations in the POI data records 127. The geographic database 119 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city).

In one embodiment, the speed profile records 129 can include any data item used by the navigation processing platform 103 including, but not limited to, map matched historical GPS probe data, substantially real-time probe data, usage data, predictor parameter data, driving history, travel profile information, user preferences, and/or the like.

The geographic database 119 can be maintained by the content provider in association with the service platform 107 (e.g., a map developer). The map developer can collect geographic data to generate and enhance the geographic database 119. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 119 can be a master geographic database stored in a format that facilitates updating, maintenance, and development. For example, the master geographic database 119 or data in the master geographic database 119 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 119 can be a master geographic database, but in alternate embodiments, the geographic database 119 can represent a compiled navigation database that can be used in or with end user devices (e.g., UEs 101) to provided navigation-related functions. For example, the geographic database 119 can be used with the end user device 101 to provide an end user with navigation features. In such a case, the geographic database 119 can be downloaded or stored on the end user device UE 101, such as in applications 111, or the end user device UE 101 can access the geographic database 119 through a wireless or wired connection (such as via a server and/or the communication network 105), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for ranking of one or more road links.

Figure 2:
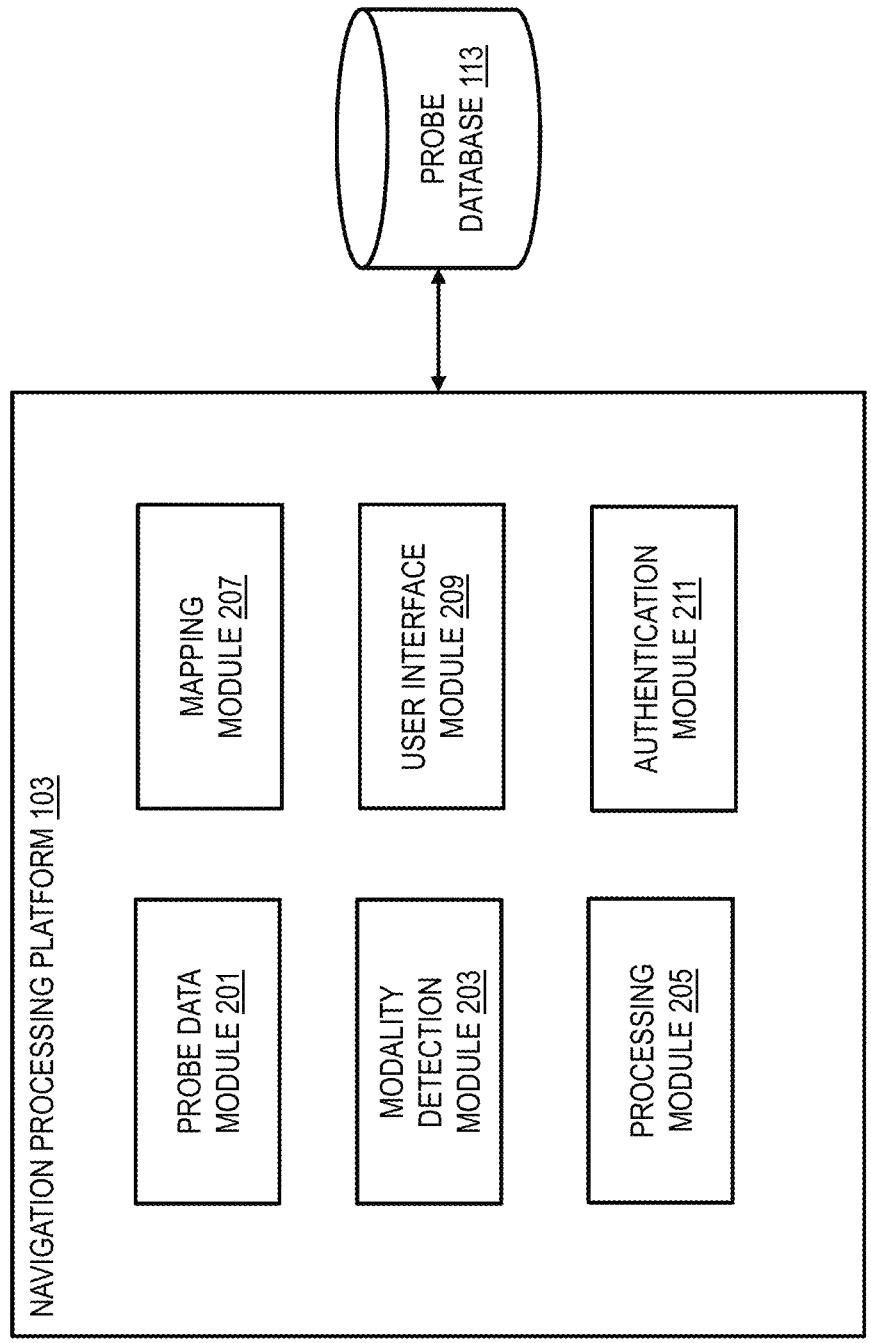
FIG. 2 is a diagram of the components of a navigation processing platform, according to one embodiment.

FIG. 2 is a diagram of the components of a navigation processing platform 103, according to one embodiment. By way of example, the navigation processing platform 103 includes one or more components for separating past speed data into speed profiles corresponding to multi-modal segments of a travel network. It is contemplated that the functions of these components may be combined in one or more components or performed by other components of equivalent functionality. In this embodiment, the navigation processing platform 103 includes a probe data module 201, a modality detection module 203, a processing module 205, a mapping module 207, a user interface (UI) module 209, and an authentication module 211.

In one embodiment, the probe data module 201 is used, in connection with the modality detection module 203, to determine one or more links of at least one travel network that includes at least one split into two or more links (e.g., an intersection or an exit from a travel route). By way of example, the probe data module 201 may determine that one or more links split into two or more links based on a detection of a bi-modal or multi-modal distribution among the one or more links (e.g., a multi-modal speed distribution at an intersection). The probe data module 201 may also determine that one or more links split into two or more links based on a determination as to whether one or more probes on a current link are also present on the next forward link or whether the one or more probes are present on the next exit link, the latter being indicative of the fact that the one or more links split into two or more links. The probe data module 201 may also be used to determine one or more speed distributions of the probe data. By way of example, the probe data may be separated between one or more links that connect to a single other link in the direction of traffic (i.e., Type I links) and one or more links which split into two or more links in the direction of traffic (i.e., Type II links). In one embodiment, the probe data module 201 may determine the one or more speed distributions for the Type I links by simply calculating the speed percentiles using all probes on the link. In one or more embodiments, the probe data module 201 may determine the one or more speed distributions for the Type II links based on a statistical process (e.g., a bin-based histogram analysis) and/or by causing, at least in part, a distribution of the probe data among the plurality of speed profiles based, at least in part, on which of the two or more links the probe data is associated with (i.e., a counting process).

The modality detection module 203 in certain embodiments is used to process and/or facilitate a processing of probe data associated with the one or more links to determine that the one or more links exhibit a multi-modality with respect to travel speed. By way of example, the modality detection module 203 may determine that the one or more links exhibit a multi-modality with respect to travel speed based on a statistical process and/or based on a counting process as described above. The modality detection module 203 may also be used to determine that one or more links exhibit the multi-modality with respect to speed based, at least in part, on at least one histogram (i.e., the statistical process). For example, if the modality detection module 203 determines two statistically significant peaks among the at least one bin-based histogram, the modality detection module 203 may determine that the distribution is a bi-modal or multi-modal distribution.

In one embodiment, the processing module 205 is used to determine the plurality of speed profiles for one or more segments of the one or more links based, at least in part, on the multi-modality. For example, the processing module 205 may first split the one or more links into two categories: (Type I links) links which connect to a single other link in the direction of traffic and (Type II links) links which split into two or more links in the direction of the traffic. In one embodiment, the processing module 205 can determine or construct the plurality of speed profiles for Type I links by calculating the speed percentiles using all probes on the link and can determine or construct the plurality of speed profiles for Type II links based, at least in part, on a statistical process or a counting process. The processing module 205 may also be used to determine travel speed information for the plurality of speed profiles based, at least in part on at least one histogram. By way of example, the processing module 205 can split the plurality of speed profiles into a speed profile from the high peak of the at least one histogram (e.g., representing the through traffic) and a speed profile from the low peak of the at least one histogram (e.g., representing the turning or exiting traffic). The processing module 205 also may be used to determine at least one first number of the at least one split into two or more links (i.e., using a counting process). By way of example, the processing module 205 can construct as many speed profiles as number of road splits in the travel route. The processing module 205 may also be used to determine travel speed information for the plurality of speed profiles based, at least in part, on the distribution of probe data. By way of example, the processing module 205 can determine that the median speed for forward driving vehicles that do not slow down at the road forking point is between 60-80 kph and that the median speed for exiting traffic exhibits the expected dip before intersections (e.g., 70 kph to 30 kph back to 70 kph). The processing module 205 also may be used to determine one or more operational speed profiles for the at least one vehicle (e.g., an autonomous vehicle) from among the plurality of speed profiles based, at least in part, on the at least one travel speed map. For example, the processing module 205 may determine the one or more operational speed profiles based on a determination of ±40% of the determined median speed.

The mapping module 207 in certain embodiments is used to cause, at least in part, a generation of at least one histogram of the one or more speed distributions along a one-dimensional axis of the one or more segments. By way of example, the mapping module 207 may render the one or more speed distributions as 10 kph bin histograms. The mapping module 207 may also be used to cause, at least in part, a generation of at least one travel speed map that associates the plurality of speed profiles with the one or more segments of the one or more links. By way of example, the mapping module 207 can generate the travel speed map from the travel speed information determined by processing module 205 from either the statistical process or the counting process discussed above.

In one embodiment, the UI module 209 is used to determine at least one route associated with at least one vehicle. For example, the UI module 209 may determine the at least one route based, at least in part, on a user's entry of a desired destination (e.g., a hotel) into an embedded navigation system of the at least one vehicle.

In one embodiment, the authentication module 211 authenticates users and UEs 101 for interaction with the navigation processing platform 103. By way of example, the authentication module 211 can receive a request to access the navigation processing platform 103 via an application 111. The request may be submitted to the authentication module 211 via the communication network 105, which enables an interface between the navigation application 111 and the navigation processing platform 103. In addition, the authentication module 201 may provide and/or validate access by the UEs 101 to share probe data and/or other location-based information with the navigation processing platform 103. It one embodiment, the authentication module 201 may further be configured to support and/or validate the formation of profile by a provider of a service 109 or a content provider 115 (i.e., for supporting integration of the capabilities for providing state classification of multi-modal travel segments with said providers or services).

Figure 3:
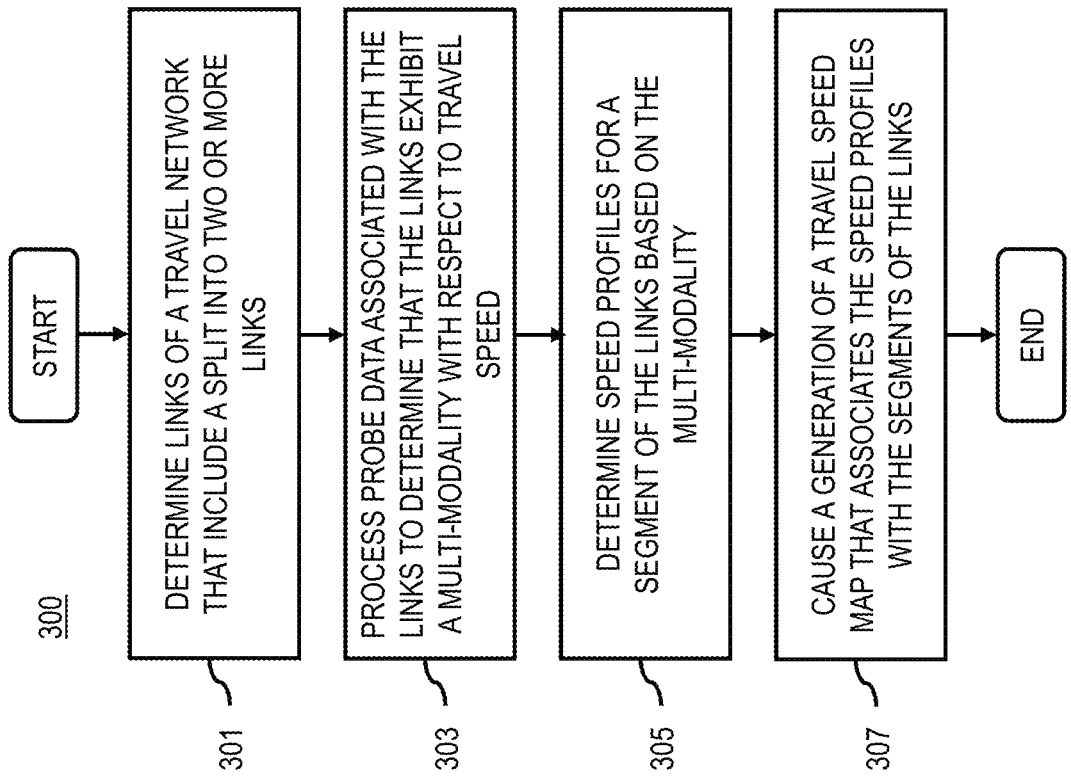
FIG. 3 is a flowchart of a process for separating past speed data into speed profiles corresponding to multi-modal segments of a travel network, according to one embodiment.
Figure 10:
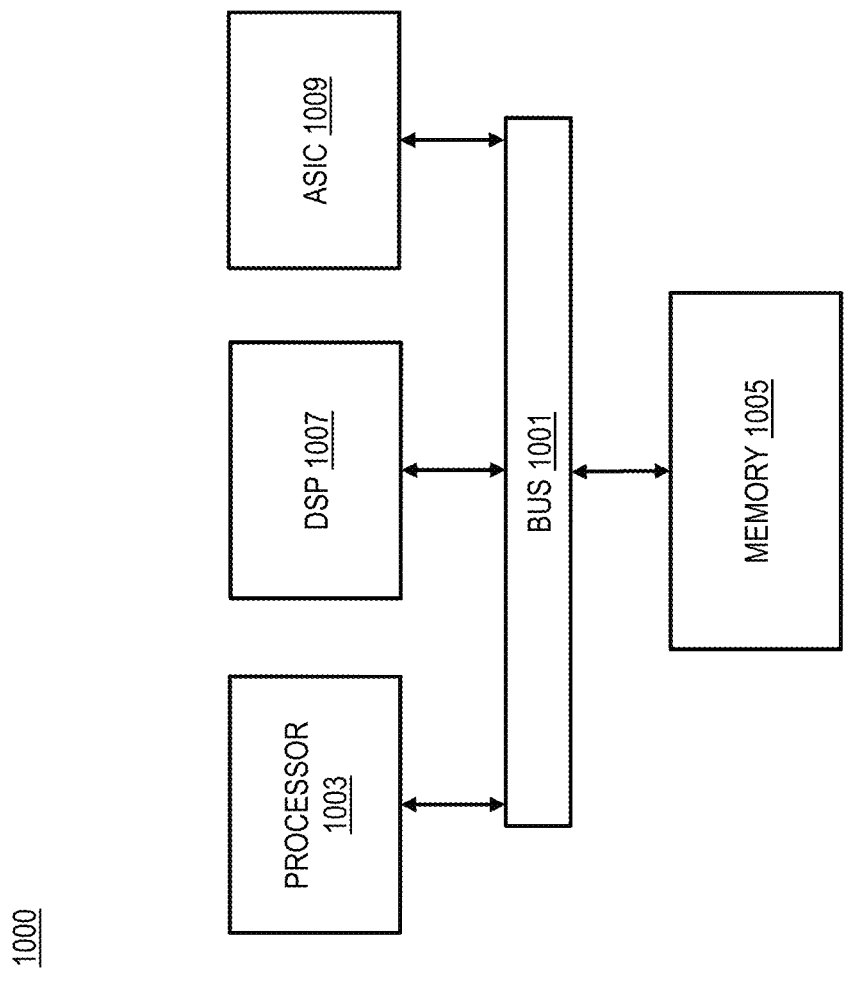
FIG. 10 is a diagram of a chip set that can be used to implement an embodiment of the invention.

FIG. 3 is a flowchart of a process for separating past speed data into speed profiles corresponding to multi-modal segments of a travel network, according to one embodiment. In one embodiment, the navigation processing platform 103 performs the process 300 and is implemented in, for instance, a chip set including a processor and a memory as shown in FIG. 10. In step 301, the navigation processing platform 103 determines one or more links of at least one travel network that includes at least one split into two or more links. By way of example, one or more links split into two or more links in situations such as at an intersection or at an exit of a highway, where some vehicles continue straight ahead with the same speed (e.g., 80 kph) while other vehicles slow down (e.g., to 10 kph) or even stop to make a turn or to exit the main road or highway.

In step 303, the navigation processing platform 103 processes and/or facilitates a processing of probe data associated with the one or more links to determine that the one or more links exhibit a multi-modality with respect to travel speed. By way of example, the probe data may be map matched historical GPS probe data (e.g., collected over a number of years). Multi-modality or bi-modality, for example, may be determined on a link including an intersection or an exit where a portion of the vehicular traffic continues straight at the same speed (e.g., 80 kph) while another portion of the traffic slows down (e.g., from 80 kph to 10 kph) and/or stops to make a turn or to take an exit. Therefore, the two travel speeds represent a multi-modality with respect to traveling on that segment of the one or more links.

In step 305, the navigation processing platform 103 determines a plurality of speed profiles for one or more segments of the one or more links based, at least in part, on the multi-modality. By way of example, the plurality of speed profiles correspond to one or more options for traversing the at least one split into the two or more links (e.g., driving straight or turning). A plurality of speed profiles are required for an autonomous vehicle, for example, because where a multi-modality exists with respect to traveling on a segment of one or more links, if an autonomous vehicle were to simply follow a speed profile (e.g., 30 kph) representing an average or median of the through traffic (e.g., 50 kph) and the turning traffic speeds (e.g., 10 kph), the vehicle would drive too slow through the intersection relative to the other traffic or would drive too fast to safely negotiate the turn or exit.

In step 307, the navigation processing platform 103 causes, at least in part, a generation of at least one travel speed map that associates the plurality of speed profiles with the one or more segments of the one or more links. By way of example, the at least one travel speed map includes, at least in part, the travel speed information determined by the navigation processing platform 103 from the speed percentiles (e.g., 30%, 50%, 70%) for Type I one or more links and the travel speed information determined by the navigation processing platform 103 from either the statistical process or the counting process for Type II links. The travel speed map can then provide an autonomous vehicle, for example, with a map layer that provides typical driving speeds on every road segment with high spatial granularity.

Figure 4:
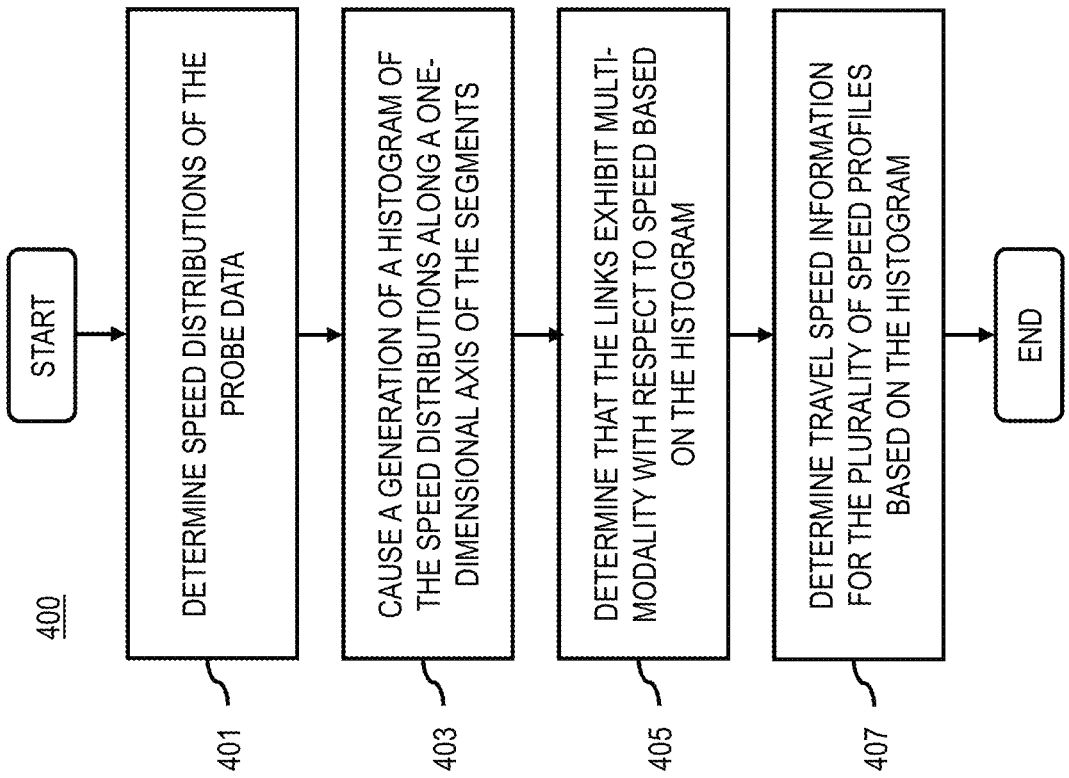
FIG. 4 is a flowchart of a process for calculating separate speed profiles for multi-modal speed distributions based on a statistical process, according to one embodiment.

FIG. 4 is a flowchart of a process for calculating separate speed profiles for multi-modal speed distributions based on a statistical process, according to one embodiment. In one embodiment, the navigation processing platform 103 performs the process 400 and is implemented in, for instance, a chip set including a processor and a memory as shown in FIG. 10. In step 401, the navigation processing platform 103 determines one or more speed distributions of the probe data. By way of example, navigation processing platform 103 can scan the one-dimensional speed distributions in each 10 m segment along the one or more links.

In step 403, the navigation processing platform 103 causes, at least in part, a generation of at least one histogram of the one or more speed distributions along a one-dimensional axis of the one or more segments. By way of example, the at least one histogram is a bin-based histogram and the bin-based histogram includes one or more bins associated with one or more speed intervals. For example, the speed distributions may be represented by 10 kph bins.

In step 405, the navigation processing platform 103 determines that the one or more links exhibit the multi-modality with respect to speed based, at least in part, on the at least one histogram. By way of example, if two statistically significant peaks or concentrations are determined by the navigation processing platform 103 (e.g., a through traffic peak at 50 kph and a turning traffic peak at 10 kph), then the navigation processing platform 103 can classify the distribution as bi-modal or multi-modal and calculate separate speed profiles for the one or more segments of the one or more links.

In step 407, the navigation processing platform 103 determines travel speed information for the plurality of speed profiles based, at least in part, on the at least one histogram. By way of example, the navigation processing platform 103 can separate or disambiguate the plurality of speed profiles into a speed profile from the high peak of at least one histogram (e.g., representing the through traffic) and a speed profile from the low peak of the histogram (e.g., representing the turning or exiting traffic). Thereafter, from each of these speed profiles, the navigation processing platform 103 can determine travel speed information for an autonomous vehicle, for example, so that a user of the vehicle may enjoy an optimal experience.

Figure 5:
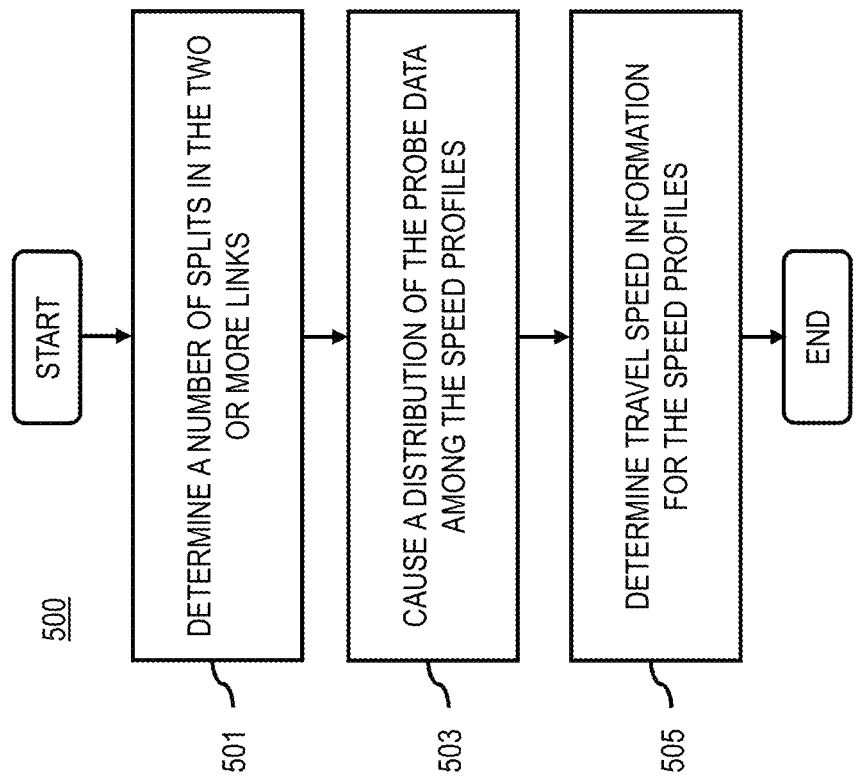
FIG. 5 is a flowchart of a process for calculating separate speed profiles for multi-modal speed distributions based on a counting process, according to one embodiment.

FIG. 5 is a flowchart of a process for calculating separate speed profiles for multi-modal speed distributions based on a counting process, according to one embodiment. In one embodiment, the navigation processing platform 103 performs the process 500 and is implemented in, for instance, a chip set including a processor and a memory as shown in FIG. 10. In step 501, the navigation processing platform 103 determines at least one first number of the at least one split into the two or more links, wherein at least one second number of the plurality of speed profiles to create is based, at least in part, on the at least one first number. By way of example, the navigation processing platform 103 builds as many speed profiles as the number of road splits in the fork that the navigation processing platform 103 can determine. For example, in the case of a highway with an exit ramp, two speed profiles are constructed by the navigation processing platform 103; one for the forward traffic continuing on the highway and one for exiting traffic turning left or right.

In step 503, the navigation processing platform 103 causes, at least in part, a distribution of the probe data among the plurality of speed profiles based, at least in part, on which of the two or more links the probe data is associated with. By way of example, following the highway with an exit ramp example, probes that are determined by the navigation processing platform 103 to be on the current link and on the next forward link are combined by the navigation processing platform 103 to generate a forward traffic speed profile. Similarly, probes that are determined by the navigation processing platform 103 to be on the current link and on the next exit link are combined by the navigation processing platform 103 to generate an exit speed profile.

In step 505, the navigation processing platform 103 determines travel speed information for the plurality of speed profiles based, at least in part, on the distribution of the probe data. By way of example, the navigation processing platform 103 can determine that the median or travel speed for the forward driving vehicles that do not slow down to exit is around 70-80 kph and that the median or travel speed for exiting traffic, which exhibits the expected dip before the exit, is around 70-80 kph, dipping down to around 30 kph at the exit, and then accelerating back up to 70-80 kph.

Figure 6:
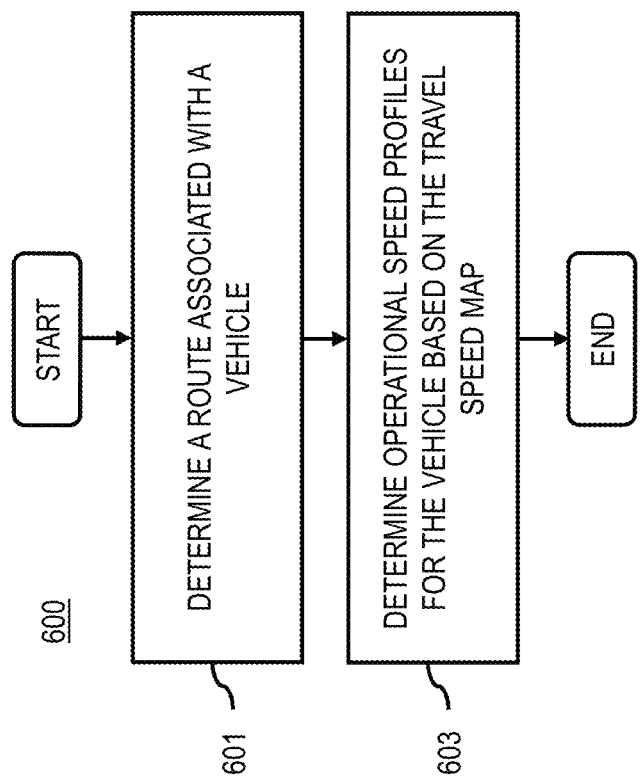
FIG. 6 is a flowchart of a process for determining one or more operational speed profiles for a vehicle, according to one embodiment.

FIG. 6 is a flowchart of a process for determining one or more operational speed profiles for a vehicle, according to one embodiment. In one embodiment, the navigation processing platform 103 performs the process 600 and is implemented in, for instance, a chip set including a processor and a memory as shown in FIG. 10. In step 601, the navigation processing platform 103 determining at least one route associated with at least one vehicle. By way of example, the navigation processing platform 103 may determine the at least one route based on a user's entry of a desired destination (e.g., a hotel) into an embedded navigation of the at least one vehicle. By way of further example, the at least one vehicle includes, at least in part, an autonomous vehicle, a highly-assisted-driving vehicle, a vehicle with predictive or adaptive cruise control, or a combination thereof.

In step 603, the navigation processing platform 103 determines one or more operational speed profiles for the at least one vehicle from among the plurality of speed profiles based, at least in part, on the at least one travel speed map. By way of example, the operational speed profile may be a speed at which despite the automotive capabilities of the vehicle (e.g., an autonomous vehicle) in terms of speed, acceleration, braking, etc., a user may still feel comfortable and safe within the vehicle while traveling (e.g., within ±40% of the median speed) and/or the vehicle may interact safely with one or more other vehicles on the same route.

Figure 7B:
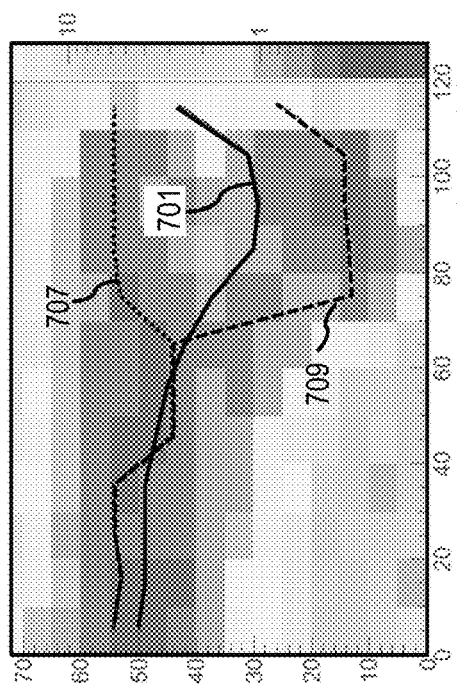
FIGS. 7A-7E are diagrams of an example of a statistically separated multi-modal speed distribution, according to one embodiment.
Figure 7A:
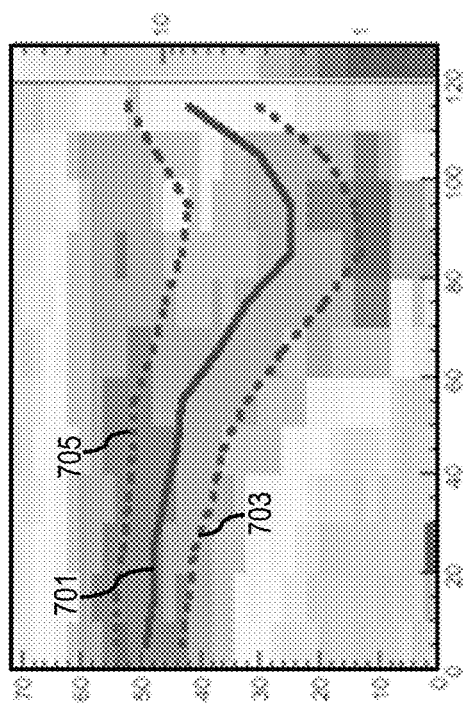

FIGS. 7A-7E are diagrams of an example of a statistically separated multi-modal speed distribution, according to one embodiment. In one embodiment, the system 100 first determines one or more speed distributions. By way of example, the system 100 can scan the one-dimensional speed distributions of the probe data. In one embodiment, the system 100 causes, at least in part, a generation of at least one histogram of the one or more speed distributions along a one-dimensional axis of the one or more segments. As shown, FIG. 7A depicts the number of GPS probes associated with one or more Type II links as pixels in a two dimensional histogram with distance (m) along the link on the horizontal axis and speed (kph) on the vertical axis. Dark pixels represent a high number of probes and light pixels represent a low number of probes. In one embodiment, the system 100 determines a first peak at the beginning of the link (e.g., at around 50 kph) and a second peak after the peak splits in two (e.g., at a distance of 70 m) at very low speeds (e.g., at around 10-15 kph) corresponding to turning vehicles. One peak continues at 50 kph, corresponding to the through traffic. The second peak slows down to very low speeds (e.g., 10-15 kph) corresponding to turning vehicles. The median, the 30% speed percentile, and the 70% speed percentile are shown by the lines 701, 703, and 705, respectively.

Figure 7E:
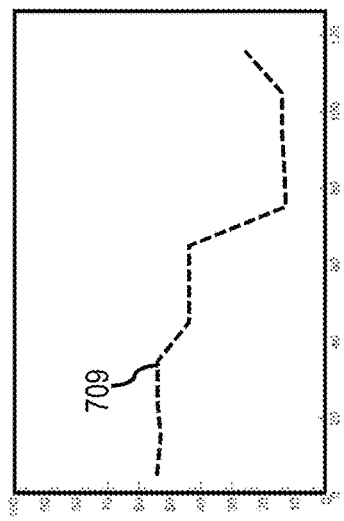
Figure 7D:
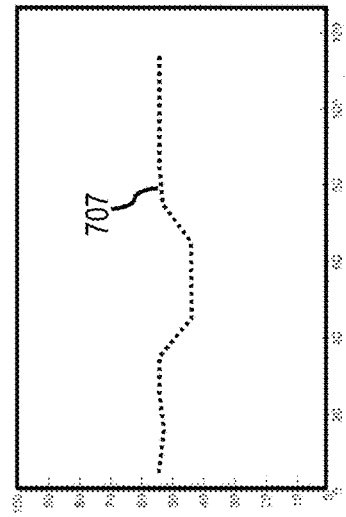
Figure 7C:
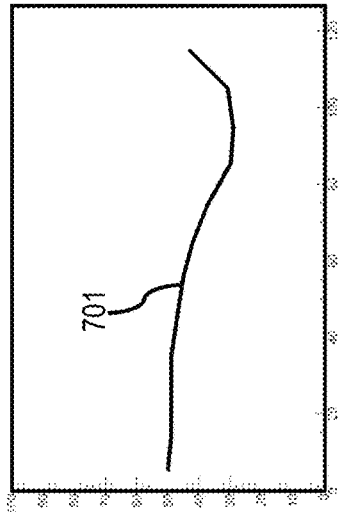

In one embodiment, the system 100 determines that the one or more links exhibit multi-modality with respect to speed based, at least in part, on the at least one histogram (e.g., peaks at 50 kph and at 10-15 kph). In one embodiment, the system 100 determines travel information for the plurality of speed profiles based, at least in part, on the at least one histogram. It is apparent from the FIG. 7A that the median speed (701) represents neither the through traffic speed or the turning traffic speed and, therefore, an autonomous vehicle, for example, driving at the median speed would be traveling too slow for the through traffic and too fast for the exiting traffic. As shown, FIG. 7B depicts the speed profiles separated into forward traffic (line 707) and turning traffic (line 709) based, at least in part, on the statistical process. For clarity, FIGS. 7C-7E depict the median speed before splitting (line 701), the speed profile from the high peak after splitting (line 707), and the speed profile from the low peak after splitting (line 709), respectively.

Figure 8B:
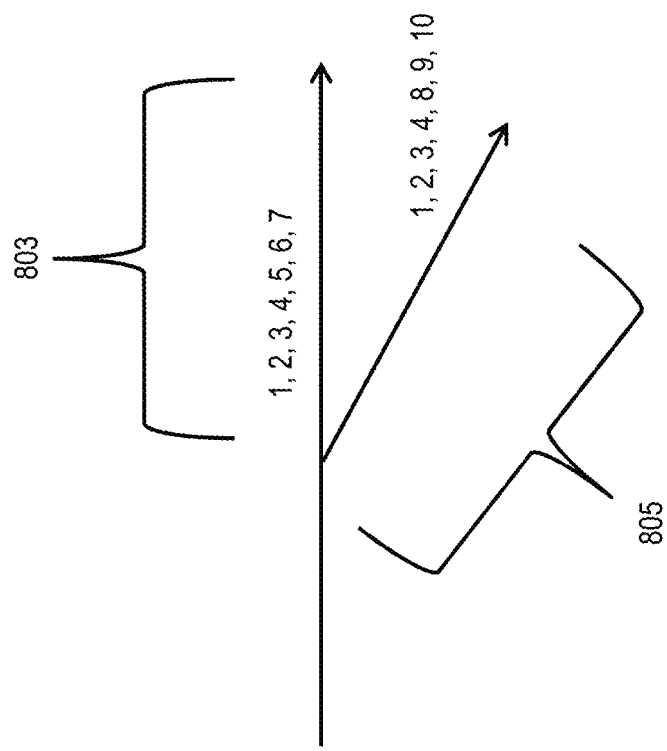
Figure 8A:
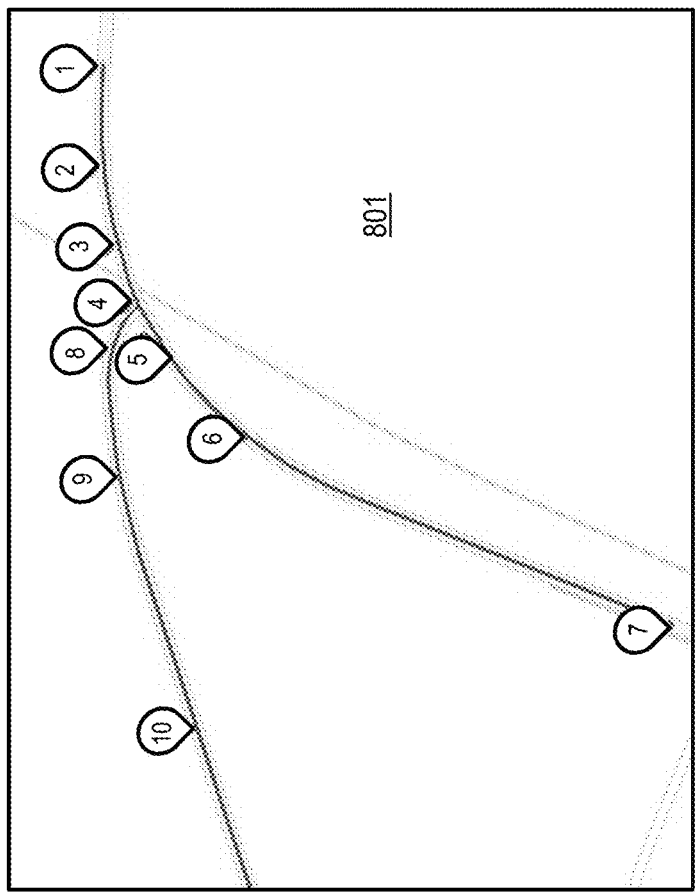

FIGS. 8A-8E are diagrams of an example a multi-modal speed distribution separated using a counting process, according to one embodiment. In one embodiment, the system 100 determines a first number of the at least one split into the two or more links. As shown, FIG. 8A depicts a travel network 801 including the links 1-10. In this example, traffic flows from the upper right corner towards the bottom left corner. A portion of the vehicles continue on the main road while others exit to the right. In one embodiment, the system 100 causes, at least in part, a distribution of the probe data among the plurality of speed profiles based, at least in part, on which of the two or more links the probe data is associated with. As shown, FIG. 8B depicts the probes determined by the system 100 to be on the current links (e.g., links 1-4) and on the next forward links (e.g., links 5-7) which are then combined by the system 100 to generate the forward traffic speed profile 803. Likewise, FIG. 8B depicts the probes determined by the system 100 to be on the current links (e.g., links 1-4) and on the next exit links (e.g., links 8-10) which are then combined by the system 100 to generate the existing speed profile 805.

In one embodiment, the system 100 determines travel speed information for the plurality of profiles based, at least in part, on the distribution of the probe data. As shown, FIG. 8C depicts the speed profiles corresponding to the links between points marked 1 through 7. The median, the 30% speed percentile, the 70% speed percentile, and the limit are shown by the lines 807, 809, 811, and 813, respectively. In particular, there is a very large dip at 200 m corresponding exactly to point 4 of FIG. 8A where the road splits. FIGS. 8D and 8E depict the speed profiles after splitting based on the counting process. As shown, the speed profile of FIG. 8D is fairly flat indicating that the forward driving vehicles do not slow down at the road forking point (point 4 of FIG. 8A). In this example, the median, the 30% speed percentile, the 70% speed percentile, and the limit are shown by the lines 815, 817, 819, and 821, respectively. As shown, the speed profile of FIG. 8E exhibits the expected dip before an intersection as vehicles slow down to safely negotiate the turn. In this example, the median, 30% speed percentile, 70% speed percentile, and limit are shown by the lines 823, 825, 827, and 829, respectively.

The processes described herein for separating past speed data into speed profiles corresponding to multi-modal segments of a travel network may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
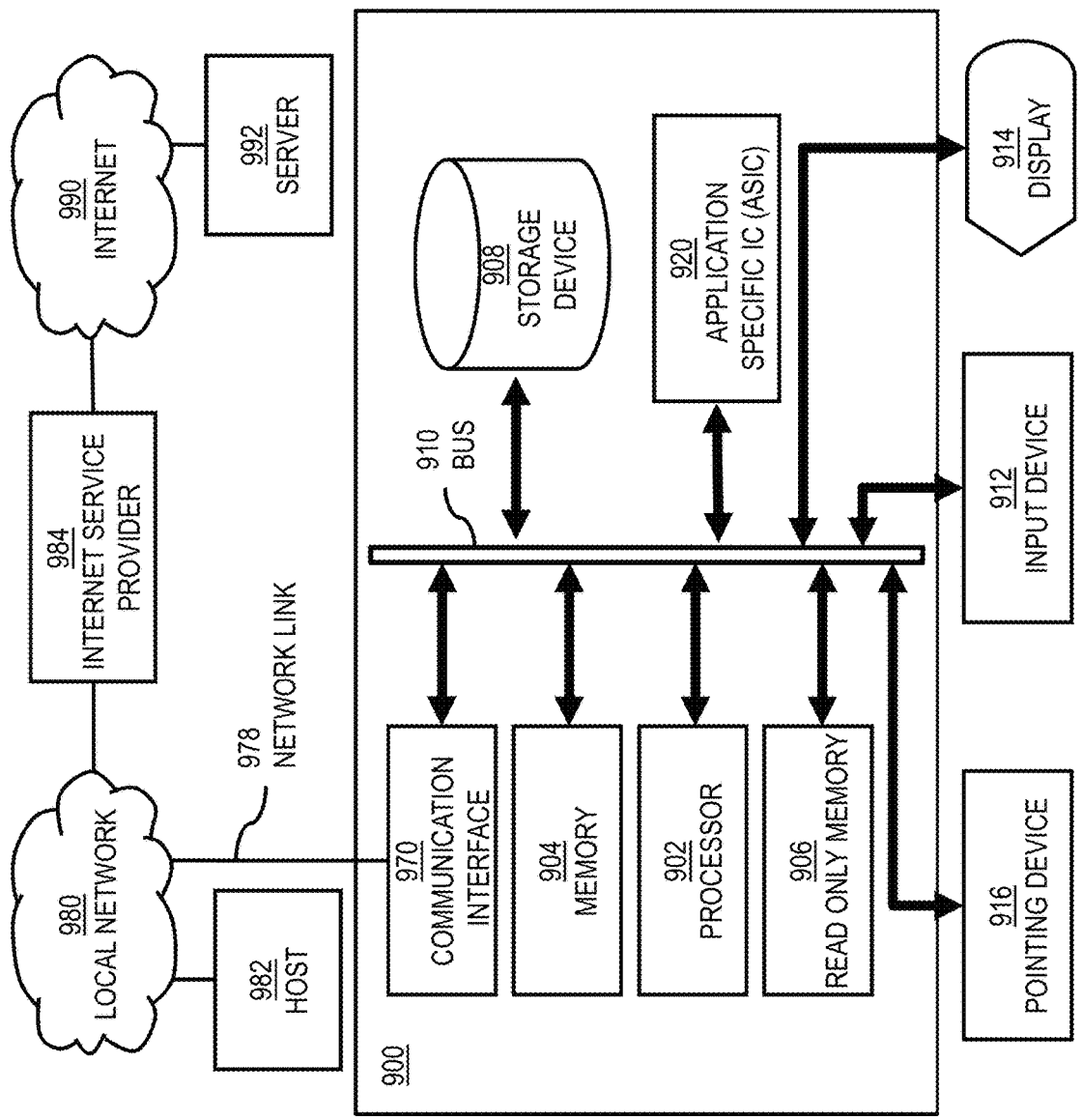
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to separate past speed data into speed profiles corresponding to multi-modal segments of a travel network as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of separating past speed data into speed profiles corresponding to multi-modal segments of a travel network.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to separate past speed data into speed profiles corresponding to multi-modal segments of a travel network. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for separating past speed data into speed profiles corresponding to multi-modal segments of a travel network. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for separating past speed data into speed profiles corresponding to multi-modal segments of a travel network, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for separating past speed data into speed profiles corresponding to multi-modal segments of a travel network to the UEs 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to separate past speed data into speed profiles corresponding to multi-modal segments of a travel network as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of separating past speed data into speed profiles corresponding to multi-modal segments of a travel network.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to separate past speed data into speed profiles corresponding to multi-modal segments of a travel network. The memory 1005 also stores the data associated with or generated by the execution of the inventive steps.

Figure 11:
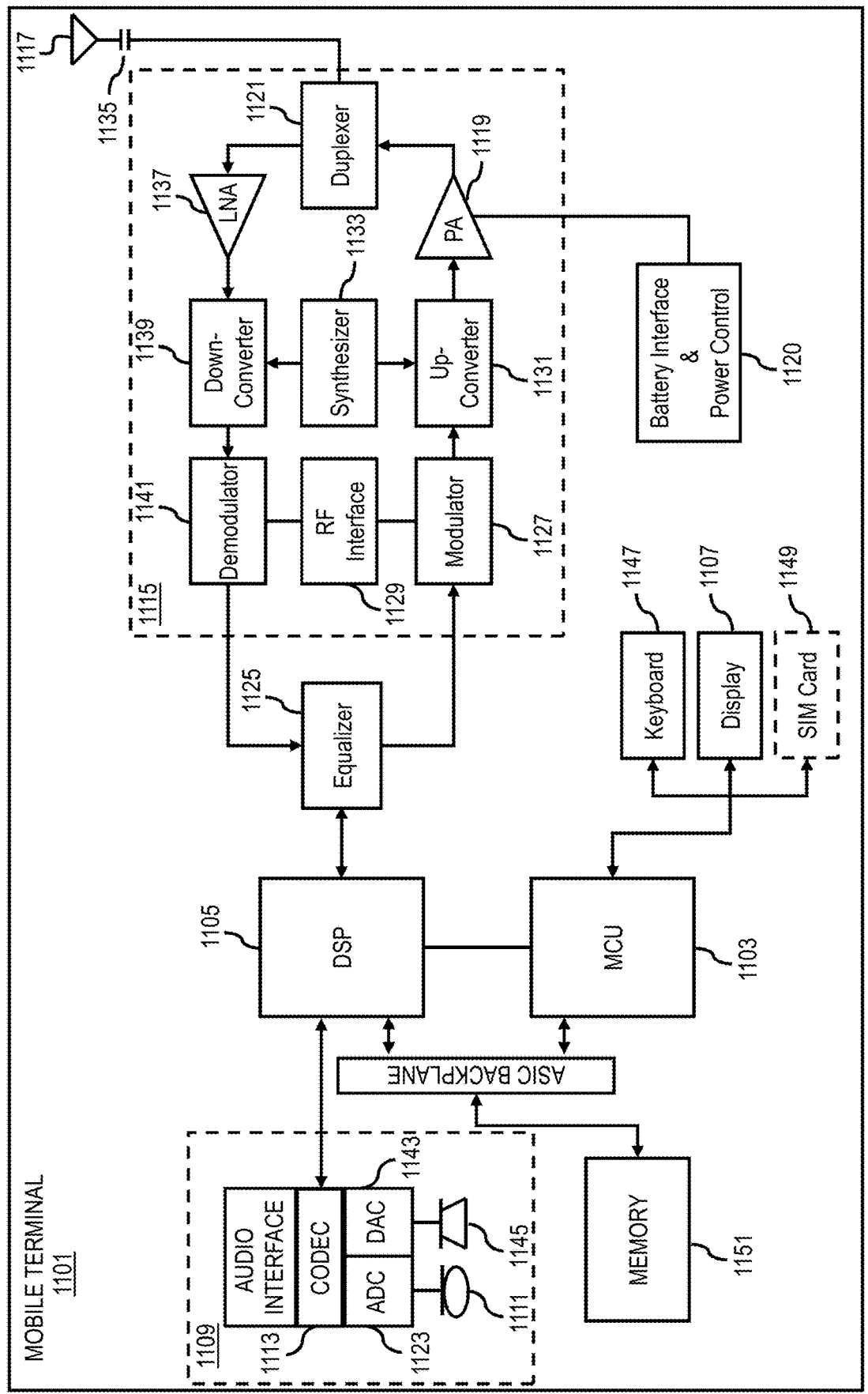
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of separating past speed data into speed profiles corresponding to multi-modal segments of a travel network. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of separating past speed data into speed profiles corresponding to multi-modal segments of a travel network. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to separate past speed data into speed profiles corresponding to multi-modal segments of a travel network. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for representing multi-modal speed profiles in a geographic database comprising:

determining, by a processor, one or more links of at least one travel network represented in the geographic database that includes at least one split into two or more links, wherein the at least one split represents an intersection point in the at least one travel network, and wherein the two or more links represent different possible paths from the intersection point;

processing probe data associated with the one or more links to determine that the one or more links exhibit a multi-modality with respect to travel speed, wherein the probe data is collected from one or more sensors of one or more vehicles traversing the at least one road network, and wherein the multi-modality indicates different groups of the one or more vehicles are traversing a same segment of the one or more links at different respective travel speeds as a result of taking the different possible paths from the intersection point;

determining a plurality of speed profiles for one or more segments of the one or more links based, at least in part, on the multi-modality;

generating, by the processor, a histogram for each one of the plurality of speed profiles along a one-dimensional axis of the one or more segments, wherein the processor is configured to separate the plurality of speed profiles into a first speed profile from a high peak of the histogram representing through traffic and a second speed profile from a low peak of the histogram representing the turning or exiting traffic; and generating, by the processor, at least one travel speed map that associates the plurality of speed profiles with the one or more segments of the one or more links, wherein the plurality of speed profiles correspond to one or more options for traversing the at least one split into two different types of links, wherein the two different types of links comprise:
  a first type link which connects another single link in a direction of traffic; and
  a second type link which splits into two or more links in the direction of the traffic selected from through traffic as a first link and turning or exiting traffic as a second link.

2. The method of claim 1, further comprising:
determining one or more speed distributions of the probe data along a one-dimensional axis of the one or more segments; and
determining that the one or more links exhibit the multi-modality with respect to speed based, at least in part, on the one or more speed distributions.

3. The method of claim 2, further comprising:
determining travel speed information for the plurality of speed profiles based, at least in part, on the one or more speed distributions.

4. The method of claim 1, further comprising:
determining at least one first number of the at least one split into the two or more links,
wherein at least one second number of the plurality of speed profiles to create is based, at least in part, on the at least one first number.

5. The method of claim 4, further comprising:
distributing the probe data among the plurality of speed profiles based, at least in part, on which of the two or more links the probe data is associated with; and
determining travel speed information for the plurality of speed profiles based, at least in part, on the distribution of the probe data.

6. The method of claim 1, further comprising:
determining at least one route associated with at least one vehicle;
determining one or more operational speed profiles for the at least one vehicle from among the plurality of speed profiles based, at least in part, on the at least one travel speed map.

7. The method of claim 1, wherein the at least one vehicle includes, at least in part, an autonomous vehicle, a highly-assisted-driving vehicle, a vehicle with predictive cruise control, or combination thereof.

8. The method of claim 1, wherein the probe data includes historical global positioning system probe (GPS) data, map matched GPS probe data, or a combination thereof.

9. An apparatus comprising:
at least one processor; and
at least one memory including computer program code for one or more programs,
the at least one memory and the computer program code configured to, with the at least one processor, cause the apparatus to perform at least the following,
  determine one or more links of at least one travel network represented in the geographic database that includes at least one split into two or more links, wherein the at least one split represents an intersection point in the at least one travel network, and wherein the two or more links represent different possible paths from the intersection point;
  process probe data associated with the one or more links to determine that the one or more links exhibit a multi-modality with respect to travel speed, wherein the probe data is collected from one or more sensors of one or more vehicles traversing the at least one road network, and wherein the multi-modality indicates different groups of the one or more vehicles are traversing a same segment of the one or more links at different respective travel speeds as a result of taking the different possible paths from the intersection point;
  determine a plurality of speed profiles for one or more segments of the one or more links based, at least in part, on the multi-modality;
  generate a histogram for each one of the plurality of speed profiles along a one-dimensional axis of the one or more segments, wherein the processor is configured to separate the plurality of speed profiles into a first speed profile from a high peak of the histogram representing through traffic and a second speed profile from a low peak of the histogram representing the turning or exiting traffic; and
  generate at least one travel speed map that associates the plurality of speed profiles with the one or more segments of the one or more links,
wherein the plurality of speed profiles correspond to one or more options for traversing the at least one split into two different types of links,
wherein the two different types of links comprise:
  a first type link which connects another single link in a direction of traffic; and
  a second type link which splits into two or more links in the direction of the traffic selected from through traffic as a first link and turning or exiting traffic as a second link.

10. The apparatus of claim 9, wherein the apparatus is further caused to:
determine one or more speed distributions of the probe data along a one-dimensional axis of the one or more segments; and
determine that the one or more links exhibit the multi-modality with respect to speed based, at least in part, on the one or more speed distributions.

11. The apparatus of claim 10, wherein the apparatus is further caused to:
determine travel speed information for the plurality of speed profiles based, at least in part, on the one or more speed distributions.

12. The apparatus of claim 9, wherein the apparatus is further caused to:

determine at least one first number of the at least one split into the two or more links, wherein at least one second number of the plurality of speed profiles to create is based, at least in part, on the at least one first number.

13. The apparatus of claim 12, wherein the apparatus is further caused to:

cause, at least in part, a distribution of the probe data among the plurality of speed profiles based, at least in part, on which of the two or more links the probe data is associated with; and determine travel speed information for the plurality of speed profiles based, at least in part, on the distribution of the probe data.

14. The apparatus of claim 9, wherein the apparatus is further caused to:

determine at least one route associated with at least one vehicle;

determine one or more operational speed profiles for the at least one vehicle from among the plurality of speed profiles based, at least in part, on the at least one travel speed map.

15. A computer readable storage medium including one or more sequences of one or more instructions which, when executed by one or more processors, cause an apparatus to at least perform:

determining, by a processor, one or more links of at least one travel network represented in the geographic database that includes at least one split into two or more links, wherein the at least one split represents an intersection point in the at least one travel network, and wherein the two or more links represent different possible paths from the intersection point;

processing probe data associated with the one or more links to determine that the one or more links exhibit a multi-modality with respect to travel speed, wherein the probe data is collected from one or more sensors of one or more vehicles traversing the at least one road network, and wherein the multi-modality indicates different groups of the one or more vehicles are traversing a same segment of the one or more links at different respective travel speeds as a result of taking the different possible paths from the intersection point;

determining a plurality of speed profiles for one or more segments of the one or more links based, at least in part, on the multi-modality;

generating, by the processor, a histogram for each one of the plurality of speed profiles along a one-dimensional axis of the one or more segments, wherein the processor is configured to separate the plurality of speed profiles into a first speed profile from a high peak of the histogram representing through traffic and a second speed profile from a low peak of the histogram representing the turning or exiting traffic; and generating, by the processor, at least one travel speed map that associates the plurality of speed profiles with the one or more segments of the one or more links, wherein the plurality of speed profiles correspond to one or more options for traversing the at least one split into two different types of links, wherein the two different types of links comprise:

a first type link which connects another single link in a direction of traffic; and a second type link which splits into two or more links in the direction of the traffic selected from through traffic as a first link and turning or exiting traffic as a second link.

16. The computer-readable storage medium of claim 15, wherein the apparatus is further caused to perform:

determining at least one first number of the at least one split into the two or more links, wherein at least one second number of the plurality of speed profiles to create is based, at least in part, on the at least one first number.

17. The computer-readable storage medium of claim 16, wherein the apparatus is further caused to perform:

causing, at least in part, a distribution of the probe data among the plurality of speed profiles based, at least in part, on which of the two or more links the probe data is associated with; and determining travel speed information for the plurality of speed profiles based, at least in part, on the distribution of the probe data.

* * * * *